United States Patent
Kobayashi

(10) Patent No.: US 12,286,601 B2
(45) Date of Patent: Apr. 29, 2025

(54) LUBRICATING OIL COMPOSITION, BUFFER AND METHOD FOR USING LUBRICATING OIL COMPOSITION

(71) Applicant: IDEMITSU KOSAN CO., LTD., Chiyoda-ku (JP)

(72) Inventor: Kenji Kobayashi, Tokyo (JP)

(73) Assignee: IDEMITSU KOSAN CO., LTD., Chiyoda-ku (JP)

(*) Notice: Subject to any disclaimer, the term of this patent is extended or adjusted under 35 U.S.C. 154(b) by 0 days.

(21) Appl. No.: 18/004,279

(22) PCT Filed: Jul. 2, 2021

(86) PCT No.: PCT/JP2021/025094
§ 371 (c)(1),
(2) Date: Jan. 4, 2023

(87) PCT Pub. No.: WO2022/009791
PCT Pub. Date: Jan. 13, 2022

(65) Prior Publication Data
US 2024/0141249 A1    May 2, 2024

(30) Foreign Application Priority Data
Jul. 6, 2020 (JP) ................ 2020-116267

(51) Int. Cl.
| | | |
|---|---|---|
| *C10M 101/02* | (2006.01) | |
| *C10M 133/56* | (2006.01) | |
| *C10M 137/10* | (2006.01) | |
| *C10M 169/04* | (2006.01) | |
| *C10N 10/04* | (2006.01) | |
| *C10N 30/06* | (2006.01) | |

(52) U.S. Cl.
CPC ...... *C10M 137/105* (2013.01); *C10M 101/02* (2013.01); *C10M 133/56* (2013.01); *C10M 169/04* (2013.01); *C10M 2215/086* (2013.01); *C10M 2223/045* (2013.01); *C10M 2223/047* (2013.01); *C10N 2010/04* (2013.01); *C10N 2030/06* (2013.01)

(58) Field of Classification Search
CPC ............ C10M 137/105; C10M 101/02; C10M 133/56; C10M 169/04; C10M 2215/086; C10M 2223/045; C10M 2223/047; C10N 2010/04; C10N 2030/06
USPC ........................................................ 508/369
See application file for complete search history.

(56) References Cited

U.S. PATENT DOCUMENTS

2002/0142922 A1* 10/2002 Yagishita ............. C10M 163/00
508/374

FOREIGN PATENT DOCUMENTS

| JP | 7-258675 A | 10/1995 |
|---|---|---|
| JP | 11-29783 A | 2/1999 |
| JP | 2002-194376 A | 7/2002 |
| JP | 2008-163166 A | 7/2008 |
| JP | 2018-203953 A | 12/2018 |
| JP | 2019-19170 A | 2/2019 |
| JP | 2019-85524 A | 6/2019 |
| WO | WO 2020/218366 A1 | 10/2020 |

OTHER PUBLICATIONS

International Search Report Issued Aug. 17, 2021, in PCT/JP2021/025094, filed on Jul. 2, 2021, 3 pages.

\* cited by examiner

*Primary Examiner* — Prem C Singh
*Assistant Examiner* — Francis C Campanell
(74) *Attorney, Agent, or Firm* — Oblon, McClelland, Maier & Neustadt, L.L.P.

(57) ABSTRACT

A lubricating oil composition may be used for lubrication of a shock absorber. The composition may include a base oil (A), a zinc dithiophosphate (B), and an alkenylsuccinic imide (C). The lubricating oil composition can be more preferably applied to lubrication of a shock absorber. Based on the total lubricating oil composition mass, a content of the component (C) in terms of nitrogen atoms is in a range of from 0.001 to 0.09 mass %, and/or a content of the component (B) in terms of zinc atoms is in a range of from 0.005 to 1.0 mass %.

20 Claims, No Drawings

LUBRICATING OIL COMPOSITION, BUFFER AND METHOD FOR USING LUBRICATING OIL COMPOSITION

CROSS-REFERENCE TO RELATED APPLICATIONS

The present application is the national stage of international application PCT/JP2021/025094, filed on Jul. 2, 2021, and claims the benefit of the filing date of Japanese Appl. No. 2020-116267, filed on Jul. 6, 2020.

TECHNICAL FIELD

The present invention relates to a lubricating oil composition, a shock absorber including the lubricating oil composition, and a method for using the lubricating oil composition.

BACKGROUND ART

A shock absorber is used after it is filled with a lubricating oil composition for a shock absorber, and it is a mechanism installed on an automobile body for the purpose of producing a damping force for damping vibration of an automobile body, optimizing frictional characteristics of a sliding part to control ride comfort of an automobile body, suppressing frictional wear of a sliding part to ensure durability, etc.

Various lubricating oil compositions for a shock absorber, which can be preferably used for such a shock absorber as above, have been developed.

For example, Patent Literature 1 discloses an invention relating to a lubricating oil composition for a shock absorber, which includes a lubricating base oil having a prescribed kinematic viscosity, and a non-dispersant poly(meth)acrylate-based viscosity modifier, a primary zinc dialkyldithiophosphate, and a secondary zinc dialkyldithiophosphate contained in the base oil, at prescribed respective contents.

CITATION LIST

Patent Literature

Patent Literature 1
Japanese Patent Laid-Open No. 2018-203953

SUMMARY OF INVENTION

Technical Problem

There is a need for further improvement in performance of such a lubricating oil composition for a shock absorber as disclosed in Patent Literature 1. On that account, a novel lubricating oil composition capable of being more preferably applied to lubrication of a shock absorber has been desired under such circumstances as above.

Solution of Problem

The present invention provides a lubricating oil composition that is used for lubrication of a shock absorber and comprises a base oil, a zinc dithiophosphate, and an alkenylsuccinic imide. Specifically, the present invention provides the following embodiments [1] to [9].

[1] A lubricating oil composition used for lubrication of a shock absorber, the composition comprising a base oil (A), a zinc dithiophosphate (B), and an alkenylsuccinic imide (C).

[2] The lubricating oil composition according to the above [1], wherein a content of the component (C) in terms of nitrogen atoms is 0.001 to 0.09 mass % based on the total amount of the lubricating oil composition.

[3] The lubricating oil composition according to the above [1] or [2], wherein a content of the component (B) in terms of zinc atoms is 0.005 to 1.0 mass % based on the total amount of the lubricating oil composition.

[4] The lubricating oil composition according to any one of the above [1] to [3], further comprising an extreme pressure additive (D) containing at least one of a sulfur atom and a phosphorus atom.

[5] The lubricating oil composition according to any one of the above [1] to [4], wherein a ratio of a content of zinc atoms derived from the component (B) to a content of nitrogen atoms derived from the component (C), [Zn/N], is 0.1 to 150.

[6] The lubricating oil composition according to any one of the above [1] to [5], wherein a content of phosphorus atoms in the lubricating oil composition is 0.01 to 2.0 mass % based on the total amount of the lubricating oil composition.

[7] The lubricating oil composition according to any one of the above [1] to [6], wherein a content of sulfur atoms in the lubricating oil composition is 0.01 to 1.0 mass % based on the total amount of the lubricating oil composition.

[8] A shock absorber filled with the lubricating oil composition according to any one of the above [1] to [7].

[9] Use of the lubricating oil composition according to any one of the above [1] to [7], wherein the lubricating oil composition is applied to lubrication of a shock absorber.

Advantageous Effects of Invention

The lubricating oil composition of preferred one embodiment of the present invention is excellent in various characteristics necessary for a lubricating oil composition for a shock absorber, such as heat stability, wear resistance and handling stability, and the lubricating oil composition of particularly preferred one embodiment is excellent in all characteristics of heat stability, wear resistance and handling stability of a shock absorber, so that it can be preferably applied to lubrication of a shock absorber.

DESCRIPTION OF EMBODIMENTS

Herein, the kinematic viscosity and the viscosity index mean values measured or calculated in accordance with JIS K2283:2000.

Herein, the weight-average molecular weight (Mw) and the number-average molecular weight (Mn) are values measured in terms of standard polystyrene by a gel permeation chromatography (GPC) method, and specifically mean values measured by the method described in Examples.

Herein, the contents of zinc atoms and phosphorus atoms mean values measured in accordance with JPI-5S-38-2003, the content of sulfur atoms means a value measured in accordance with JIS K2541-6, and the content of nitrogen atoms means a value measured in accordance with JIS K2609.

Regarding the numerical range described herein, the upper limit and the lower limit can be arbitrarily combined. For example, there is a recitation "preferably 30 to 100, more preferably 40 to 80" for a numerical range, the range of "30 to 80" and the range of "40 to 100" are also included in the numerical range described herein. Alternatively, for example, there is a recitation "preferably 30 or more, more preferably 40 or more, and preferably 100 or less, more preferably 80 or less" for a numerical range, the range of "30 to 80" and the range of "40 to 100" are also included in the numerical range described herein.

In addition, for example, a recitation "60 to 100" as the numerical range described herein means a range of "60 or more and 100 or less".

[Constitution of Lubricating Oil Composition]

The lubricating oil composition of the present invention comprises a base oil (A), a zinc dithiophosphate (B), and an alkenylsuccinic imide (C).

Addition of a zinc dithiophosphate to a lubricating oil composition used for a shock absorber can improve handling stability of a shock absorber while making wear resistance better. According to the study by the present inventor, however, it has been found that when a lubricating oil composition containing a zinc dithiophosphate is used at high temperatures, sludge attributable to the zinc dithiophosphate is easily deposited with heat deterioration of the lubricating oil composition. If sludge is deposited in a shock absorber, there is a fear that clogging of the valve portion, etc. are brought about and the shock absorber cannot sufficiently provide its performance. The present inventor has found that by adding an alkenylsuccinic imide together with a zinc dithiophosphate to cope with such a problem as above, a lubricating oil composition can be obtained that can not only improve handling stability of a wear-resistant shock absorber, but also suppress generation of sludge even in the use in a high-temperature environment, and moreover, has excellent heat stability. The lubricating oil composition of the present invention has been accomplished based on this finding.

In view of obtaining a lubricating oil composition having more improved wear resistance, handling stability of a shock absorber and heat stability with a good balance, the ratio of the content of zinc atoms derived from the component (B) to the content of nitrogen atoms derived from the component (C) in the lubricating oil composition of one embodiment of the present invention, [Zn/N], is preferably 0.1 or more, more preferably 0.5 or more, still more preferably 1.0 or more, still much more preferably 1.5 or more, and particularly preferably 2.0 to more, or may be 2.2 or more, 2.5 or more, 2.7 or more, 3.0 or more, or 3.2 or more, and it is preferably 150 or less, more preferably 100 or less, still more preferably 50 or less, still much more preferably 30 or less, and particularly preferably 15 or less, or may be 12 or less, 10 or less, 9.0 or less, 8.0 or less, 7.5 or less, 7.0 or less, 6.8 or less, 6.5 or less, 6.2 or less, 6.0 or less, 5.8 or less, 5.5 or less, 5.2 or less, 5.0 or less, 4.8 or less, 4.5 or less, or 4.2 or less.

The lubricating oil composition of one embodiment of the present invention preferably further contains an extreme pressure additive (D) containing at least one of a sulfur atom and a phosphorus atom.

The lubricating oil composition of one embodiment of the present invention may further contain one or more selected from an antioxidant (E), a viscosity index improver (F), and a friction modifier (G), and may further contain other lubricating oil additives than the components (B) to (G) when needed as long as the effects of the present invention are not impaired.

In the lubricating oil composition of one embodiment of the present invention, the total content of the components (A) to (C) is preferably 50 mass % or more, more preferably 55 mass % or more, more preferably 60 mass % or more, more preferably 65 mass % or more, still more preferably 70 mass % or more, still more preferably 75 mass % or more, still much more preferably 80 mass % or more, still much more preferably 85 mass % or more, and particularly preferably 90 mass % or more, and may be 100 mass % or less, 99.9 mass % or less, 99.5 mass % or less, 99.0 mass % or less, 98.5 mass % or less, 98.0 mass % or less, 97.5 mass % or less, or 97.0 mass % or less, based on the total amount (100 mass %) of the lubricating oil composition.

In the lubricating oil composition of one embodiment of the present invention, the total content of the components (A) to (D) is preferably 52 mass % or more, more preferably 57 mass % or more, more preferably 62 mass % or more, more preferably 67 mass % or more, still more preferably 72 mass % or more, still more preferably 77 mass % or more, still much more preferably 82 mass % or more, still much more preferably 87 mass % or more, and particularly preferably 92 mass % or more, and may be 100 mass % or less, 99.9 mass % or less, 99.5 mass % or less, 99.0 mass % or less, 98.5 mass % or less, or 98.0 mass % or less, based on the total amount (100 mass %) of the lubricating oil composition.

In the lubricating oil composition of one embodiment of the present invention, the total content of the components (A) to (G) is preferably 55 mass % or more, more preferably 60 mass % or more, more preferably 65 mass % or more, more preferably 70 mass % or more, still more preferably 75 mass % or more, still more preferably 80 mass % or more, still much more preferably 85 mass % or more, still much more preferably 90 mass % or more, and particularly preferably 95 mass % or more, and may be 100 mass % or less, 99.9 mass % or less, 99.5 mass % or less, 99.0 mass % or less, 98.5 mass % or less, or 98.0 mass % or less, based on the total amount (100 mass %) of the lubricating oil composition.

Details of the components contained in the lubricating oil composition of one embodiment of the present invention will be described hereinafter.

<Component A: Base Oil>

As the base oil that is a component (A) used in one embodiment of the present invention, one or more selected from mineral oils and synthetic oils can be mentioned.

Examples of the mineral oils include atmospheric residues obtained by subjecting crude oils, such as paraffinic crude oil, intermediate base crude oil and naphthenic crude oil, to atmospheric distillation; distillates obtained by subjecting these atmospheric residues to vacuum distillation; and refined oils obtained by subjecting the distillates to one or more of refining treatments, such as solvent deasphalting, solvent extraction, hydrocracking, solvent dewaxing, catalytic dewaxing, and hydrorefining.

Examples of the synthetic oils include poly-α-olefins, such as an α-olefin homopolymer and an α-olefin copolymer (for example, an α-olefin copolymer having 8 to 14 carbon atoms such as an ethylene-α-olefin copolymer); isoparaffin; polyalkylene glycol; ester oils, such as polyol ester, dibasic acid ester, and phosphoric acid ester; ether oils, such as polyphenyl ether; alkylbenzene; alkylnaphthalene; and synthetic oil (GTL) obtained by isomerizing wax (GTL WAX (Gas To Liquids WAX)) produced from natural gas through Fischer-Tropsch process or the like.

The component (A) used in one embodiment of the present invention preferably contains, among these, one or more selected from mineral oils classified in Group II and Group III of API (American Petroleum Institute) base oil categories, and synthetic oils.

The kinematic viscosity of the component (A) used in one embodiment of the present invention at 40° C. is preferably 5.0 to 100 mm²/s, more preferably 7.0 to 80 mm²/s, still more preferably 10.0 to 60 mm²/s, and still much more preferably 12.0 to 45 mm²/s.

The viscosity index of the component (A) used in one embodiment of the present invention is appropriately set according to the application of the lubricating oil composition, and is preferably 70 or more, more preferably 80 or more, still more preferably 90 or more, still much more preferably 100 or more, and particularly preferably 110 or more.

When a mixed oil that is a combination of two or more base oils is used as the component (A) in one embodiment of the present invention, the kinematic viscosity and the viscosity index of the mixed oil are preferably in the above ranges.

In the lubricating oil composition of one embodiment of the present invention, the content of the component (A) is preferably 40 mass % or more, more preferably 50 mass % or more, still more preferably 60 mass % or more, still much more preferably 70 mass % or more, and particularly preferably 80 mass % or more, and may be 82 mass % or more, 85 mass % or more, 87 mass % or more, 90 mass % or more or 92 mass % or more and is preferably 99.5 mass % or less, more preferably 99.0 mass % or less, still more preferably 98.5 mass % or less, still much more preferably 98.0 mass % or less, and particularly preferably 97.0 mass % or less, based on the total amount (100 mass %) of the lubricating oil composition.

In the component (A) used in one embodiment of the present invention, the content of the mineral oil is preferably 50 mass % or more, more preferably 60 mass % or more, still more preferably 70 mass % or more, still much more preferably 75 mass % or more, and particularly preferably 80 mass % or more, or may be 82 mass % or more, 85 mass % or more, 87 mass % or more, 90 mass % or more, or 92 mass % or more, based on the total amount (100 mass %) of the component (A) contained in the lubricating oil composition.

The upper limit of the content of the mineral oil can be arbitrarily set, and may be 100 mass % or less, 99.5 mass % or less, 99.0 mass % or less, 98.5 mass % or less, 98.0 mass % or less, 97.0 mass % or less, or 95.0 mass % or less, based on the total amount (100 mass %) of the component (A) contained in the lubricating oil composition.

<Component (B): Zinc Dithiophosphate>

The lubricating oil composition of the present invention contains, as a component (B), a zinc dithiophosphate. By incorporating the component (B), a lubricating oil composition having improved wear resistance and handling stability of a shock absorber can be obtained.

The component (B) may be used singly, or may be used in combination of two or more.

As the component (B) used in one embodiment of the present invention, a compound represented by the following general formula (b-1) can be mentioned.

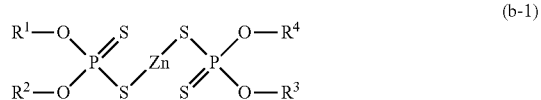
(b-1)

In the formula (b-1), $R^1$ to $R^4$ each independently represent a hydrocarbon group, and they may be the same as one another, or may be different from one another.

The number of carbon atoms of the hydrocarbon group capable of being selected as $R^1$ to $R^4$ is preferably 1 to 20, more preferably 1 to 16, still more preferably 1 to 12, and still much more preferably 3 to 10.

Specific examples of the hydrocarbon groups capable of being selected as $R^1$ to $R^4$ include alkyl groups, such as a methyl group, an ethyl group, a propyl group, a butyl group, a pentyl group, a hexyl group, a heptyl group, an octyl group, a nonyl group, a decyl group, a undecyl group, a dodecyl group, a tridecyl group, a tetradecyl group, a pentadecyl group, a hexadecyl group, a heptadecyl group, and an octadecyl group; alkenyl groups, such as an octenyl group, a nonenyl group, a decenyl group, a undecenyl group, a dodecenyl group, a tridecenyl group, a tetradecenyl group, and a pentadecenyl group; cycloalkyl groups, such as a cyclohexyl group, a dimethylcyclohexyl group, an ethylcyclohexyl group, a propylcyclohexyl group, a butylcyclohexyl group, and a heptylcyclohexyl group; alicyclic hydrocarbon groups, such as a methylcyclohexylmethyl group and a cyclohexylethyl group; aryl groups, such as a phenyl group, a naphthyl group, an anthracenyl group, a biphenyl group, and a terphenyl group; alkylaryl groups, such as a tolyl group, a dimethylphenyl group, a butylphenyl group, a nonylphenyl group, a methylbenzyl group, and a dimethylnaphthyl group; and arylalkyl groups, such as a phenylmethyl group, a phenylethyl group, and a diphenylmethyl group.

As the hydrocarbon groups capable of being selected as $R^1$ to $R^4$, preferable are alkyl groups among these.

In view of obtaining a lubricating oil composition having more improved handling stability of a shock absorber and also having more improved wear resistance, the content of the component (B) in terms of zinc atoms in the lubricating oil composition of one embodiment of the present invention is preferably 0.005 mass % or more, more preferably 0.01 mass % or more, still more preferably 0.02 mass % or more, still much more preferably 0.03 mass % or more, and particularly preferably 0.04 mass % or more, or may be 0.05 mass % or more, 0.06 mass % or more, or 0.07 mass % or more, and in view of obtaining a lubricating oil composition that has good heat stability and easily exhibits a sludge suppressing effect due to a dispersant more efficiently, it is preferably 1.0 mass % or less, more preferably 0.70 mass % or less, still more preferably 0.50 mass % or less, still much more preferably 0.30 mass % or less, and particularly preferably 0.12 mass % or less, or may be 0.11 mass % or less, 0.10 mass % or less, or 0.09 mass % or less, based on the total amount (100 mass %) of the lubricating oil composition.

<Component (C): Alkenylsuccinic Imide>

The lubricating oil composition of the present invention contains, as a component (C), an alkenylsuccinic imide. By incorporating the component (C), a lubricating oil composition can be obtained that can suppress generation of sludge even in the use in a high-temperature environment and is excellent in heat stability.

The component (C) may be used singly, or may be used in combination of two or more.

As the component (C) used in one embodiment of the present invention, an alkenylsuccinic acid monoimide represented by the following general formula (c-1), and an alkenylsuccinic acid bisimide represented by the following general formula (c-2) can be mentioned.

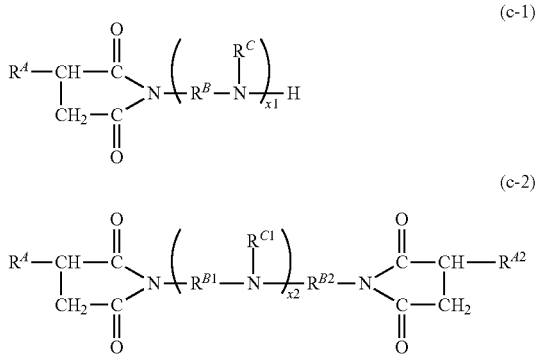

In the general formulae (c-1) and (c-2), $R^A$, $R^{A1}$ and $R^{A2}$ are each independently an alkenyl group having a weight-average molecular weight (Mw) of 500 to 3000. Examples of the alkenyl groups include a polybutenyl group, a polyisobutenyl group, and an ethylene-propylene copolymer, and preferable is a polybutenyl group or a polyisobutenyl group.

$R^B$, $R^{B1}$ and $R^{B2}$ are each independently an alkylene group having 2 to 5 carbon atoms.

$R^C$ and $R^{C1}$ are each independently a hydrogen atom, an alkyl group having 1 to 10 carbon atoms, or a group represented by -(AO)$_n$—H (wherein A is each independently an alkylene group having 2 to 4 carbon atoms, and n is an integer of 1 to 10).

x1 is an integer of 1 to 10, preferably an integer of 2 to 5, and more preferably 3 or 4.

x2 is an integer of 0 to 10, preferably an integer of 1 to 5, and more preferably an integer of 2 to 4.

The alkenylsuccinic imide used as the component (C) in one embodiment of the present invention may be an unmodified alkenylsuccinic imide, or may be a boron-modified alkenylsuccinic imide.

Examples of the boron-modified alkenylsuccinic imide include a boron-modified product of an alkenylsuccinic acid monoimide represented by the general formula (c-1), and a boron-modified product of an alkenylsuccinic acid bisimide represented by the above general formula (c-2).

When the boron-modified alkenylsuccinic imide is used as the component (C), the mass ratio of boron atoms to nitrogen atoms included in the component (C) used in one embodiment of the present invention, [B/N], may be 0.01 or more, 0.05 or more, 0.1 or more, 0.2 or more, or 0.3 or more, and may be 0.95 or less, 0.90 or less, 0.85 or less, 0.80 or less, 0.75 or less, or 0.70 or less.

When the boron-modified alkenylsuccinic imide is used as the component (C) in the lubricating oil composition of one embodiment of the present invention, the content of boron atoms derived from the component (C) may be 0.001 mass % or more, 0.005 mass % or more, or 0.01 mass % or more, and may be 0.20 mass % or less, 0.15 mass % or less, or 0.10 mass % or less, based on the total amount (100 mass %) of the lubricating oil composition.

Herein, the content of boron atoms means a value measured in accordance with JPI-5S-38-2003.

The base number of the component (C) used in one embodiment of the present invention is preferably 0 to 200 mgKOH/g, more preferably 5 to 150 mgKOH/g, still more preferably 10 to 100 mgKOH/g, still much more preferably 15 to 80 mgKOH/g, and particularly preferably 20 to 50 mgKOH/g.

Herein, the base number means a value measured in accordance with perchloric acid method of JIS K2501:2003.

In view of obtaining a lubricating oil composition capable of more efficiently suppressing generation of sludge even when it is used in a high-temperature environment, the content of the component (C) in terms of nitrogen atoms in the lubricating oil composition of one embodiment of the present invention is preferably 0.001 mass % or more, more preferably 0.005 mass % or more, still more preferably 0.007 mass % or more, still much more preferably 0.009 mass % or more, and particularly preferably 0.013 mass % or more, or may be 0.015 mass % or more, 0.017 mass % or more, or 0.02 mass % or more, and in view of obtaining a lubricating oil composition that allows other additives to easily exhibit their functions and has excellent wear resistance, it is preferably 0.09 mass % or less, more preferably 0.08 mass % or less, still more preferably 0.07 mass % or less, still much more preferably 0.06 mass % or less, and particularly preferably 0.05 mass % or less, or may be 0.045 mass % or less, 0.04 mass % or less, or 0.035 mass % or less, based on the total amount (100 mass %) of the lubricating oil composition.

<Other Ashless Dispersants>

The lubricating oil composition of one embodiment of the present invention may contain other ashless dispersants than the component (C) as long as the effects of the present invention are not impaired.

Examples of such other ashless dispersants include succinic acid monoimide, succinic acid bisimide, benzylamine, a succinic acid ester, and boron-modified products of these.

In the lubricating oil composition of one embodiment of the present invention, however, the content of other ashless dispersants than the component (C) is preferably 0 to 50 parts by mass, more preferably 0 to 30 parts by mass, still more preferably 0 to 10 parts by mass, still much more preferably 0 to 5 parts by mass, and particularly preferably 0 to 1 part by mass, based on the total amount of 100 parts by mass of the component (C) contained in the lubricating oil composition.

<Component (D): Extreme Pressure Additive>

The lubricating oil composition of one embodiment of the present invention preferably further contains, as a component (D), an extreme pressure additive containing at least one of a sulfur atom and a phosphorus atom.

By incorporating the component (D), a lubricating oil composition having more improved wear resistance can be obtained. The component (D) may be a factor of generation of sludge when it is used in a high-temperature environment. However, since the lubricating oil composition of the present invention contains the component (C), generation of sludge attributable to the component (D) can be effectively suppressed, so that the lubricating oil composition can be one having excellent heat stability.

Examples of the component (D) used in one embodiment of the present invention include a phosphorus-based extreme pressure additive, which contains a phosphorus atom, a sulfur-based extreme pressure additive, which contains a sulfur atom, and a sulfur-phosphorus-based extreme pressure additive, which contains a sulfur atom and a phosphorus atom.

These as the component (D) may be used singly, or may be used in combination of two or more.

These extreme pressure additives may be each in the form of an amine salt.

Examples of the phosphorus-based extreme pressure additives include neutral phosphoric acid esters, such as an aryl phosphate, an alkyl phosphate, an alkenyl phosphate, and an alkylaryl phosphate; acid phosphoric acid esters, such as a monoaryl acid phosphate, a diaryl acid phosphate, a monoalkyl acid phosphate, a dialkyl acid phosphate, a monoalkenyl acid phosphate, and a dialkenyl acid phosphate; amine salts of the acid phosphoric acid esters; phosphorous acid esters, such as an aryl hydrogen phosphite, an alkyl hydrogen phosphite, an aryl phosphite, an alkyl phosphite, an alkenyl phosphite, and an arylalkyl phosphite; acid phosphorous acid esters, such as a monoalkyl acid phosphite, a dialkyl acid phosphite, a monoalkenyl acid phosphite, and a dialkenyl acid phosphite; and amine salts of the acid phosphorous acid esters.

Examples of the sulfur-based extreme pressure additives include sulfurized fat and oil, a sulfurized fatty acid, a sulfurized ester, a sulfurized olefin, a monosulfide, a polysulfide, a dihydrocarbyl polysulfide, a thiadiazole, an alkylthiocarbamoyl, a thiocarbamate, a dithiocarbamate, a thioterpene, and a dialkyl thiodipropionate.

Examples of the sulfur-phosphorus-based extreme pressure additives include a monothiophosphoric acid ester, a dithiophosphoric acid ester, a trithiophosphoric acid ester, a monothiophosphorous acid ester, a dithiophosphorous acid ester, a trithiophosphorous acid ester, and amine salts of these.

In view of obtaining a lubricating oil composition having more improved wear resistance and heat resistance with a good balance, the component (D) used in one embodiment of the present invention preferably contains a phosphorus-based extreme pressure additive among these.

From the above viewpoint, the content of the phosphorus-based extreme pressure additive in the component (D) in the lubricating oil composition of one embodiment of the present invention is preferably 30 to 100 mass %, more preferably 40 to 100 mass %, more preferably 50 to 100 mass %, more preferably 60 to 100 mass %, still more preferably 70 to 100 mass %, still much more preferably 80 to 100 mass %, and particularly preferably 90 to 100 mass %, based on the total amount (100 mass %) of the component (D) contained in the lubricating oil composition.

In view of obtaining a lubricating oil composition having more improved wear resistance, the content of the component (D) in the lubricating oil composition of one embodiment of the present invention is preferably 0.001 mass % or more, more preferably 0.005 mass % or more, still more preferably 0.01 mass % or more, still much more preferably 0.02 mass % or more, and particularly preferably 0.03 mass % or more, or may be 0.05 mass % or more, 0.10 mass % or more, 0.15 mass % or more, 0.20 mass % or more, 0.25 mass % or more, 0.30 mass % or more, 0.35 mass % or more, or 0.40 mass % or more, and in view of obtaining a lubricating oil composition having good heat stability, it is preferably 5.0 mass % or less, more preferably 4.0 mass % or less, still more preferably 3.0 mass % or less, still much more preferably 2.5 mass % or less, and particularly preferably 2.0 mass % or less, or may be 1.7 mass % or less, 1.5 mass % or less, or 1.2 mass % or less, based on the total amount (100 mass %) of the lubricating oil composition.

<Component (E): Antioxidant>

The lubricating oil composition of one embodiment of the present invention may contain, as a component (E), an antioxidant.

The component (E) may be used singly, or may be used in combination of two or more.

Examples of the component (E) used in one embodiment of the present invention include a phenolic antioxidant, an amine-based antioxidant, and a molybdenum-based antioxidant.

Examples of the phenolic antioxidants include monophenolic antioxidants, such as 2,6-di-t-butylphenol, 2,6-di-t-butyl-4-methylphenol, 2,6-di-t-butyl-4-ethylphenol, C7-C9 alkyl-3-(3,5-di-t-butyl-4-hydroxyphenyl)propionate, isooctyl-3-(3,5-t-butyl-4-hydroxyphenyl)propionate, and octadecyl-3-(3,5-di-t-butyl-4-hydroxyphenyl)propionate; diphenolic antioxidants, such as 4,4'-methylenebis(2,6-di-t-butylphenol) and 2,2'-methylenebis(4-ethyl-6-t-butylphenol); and hindered phenolic antioxidants.

Examples of the amine-based antioxidants include diphenylamine-based antioxidants, such as diphenylamine and alkylated diphenylamine having an alkyl group having 3 to 20 carbon atoms; and naphthylamine-based antioxidants, such as α-naphthylamine, phenyl-α-naphthylamine, and substituted phenyl-α-naphthylamine having an alkyl group having 3 to 20 carbon atoms.

Examples of the molybdenum-based antioxidants include a molybdenum amine complex obtained by allowing molybdenum trioxide and/or molybdic acid to react with an amine compound.

In the lubricating oil composition of one embodiment of the present invention, the content of the component (E) is preferably 0.01 to 10 mass %, more preferably 0.05 to 7 mass %, still more preferably 0.1 to 5 mass %, and still much more preferably 0.2 to 3 mass %, based on the total amount (100 mass %) of the lubricating oil composition.

<Component (F): Viscosity Index Improver>

The lubricating oil composition of one embodiment of the present invention may contain, as a component (F), a viscosity index improver.

The component (F) may be used singly, or may be used in combination of two or more.

Examples of the component (F) used in one embodiment of the present invention include olefin-based copolymers such as an ethylene-α-olefin copolymer, and polymethacrylates at least having a constituent unit derived from an alkyl acrylate or an alkyl methacrylate.

The weight-average molecular weight (Mw) of the component (F) used in one embodiment of the present invention is preferably 5,000 to 1,000,000, more preferably 10,000 to 800,000, still more preferably 30,000 to 700,000, and still much more preferably 50,000 to 600,000.

In the lubricating oil composition of one embodiment of the present invention, the content of the component (F) is preferably 0.01 to 15 mass %, more preferably 0.1 to 10 mass %, still more preferably 0.5 to 5.0 mass %, and still much more preferably 1.0 to 3.0 mass %, based on the total amount (100 mass %) of the lubricating oil composition.

Resin components, such as the viscosity index improver, are each often on the market in the form of a solution in which such a substance is dissolved in a diluent oil, taking handling properties and solubility in the base oil (A) into consideration.

Herein, however, in the case of the solution obtained by dilution with a diluent oil, the content of the resin component, such as the viscosity index improver, is a content in terms of the resin component (solid component), excluding the mass of the diluent oil.

<Component (G): Friction Modifier>

The lubricating oil composition of one embodiment of the present invention may contain, as a component (G), a friction modifier.

The component (G) may be used singly, or may be used in combination of two or more.

Examples of the component (G) used in one embodiment of the present invention include molybdenum-based friction modifies, such as molybdenum dithiocarbamate (MoDTC)

and molybdenum dithiophosphate (MoDTP); and ashless friction modifiers, such as an aliphatic amine, a fatty acid ester, a fatty acid, an aliphatic alcohol and an aliphatic ether.

The component (G) used in one embodiment of the present invention preferably contains a fatty acid ester among these.

As the fatty acid ester, a partial ester compound having one or more hydroxyl groups, such as a partial ester compound obtained by the reaction of a fatty acid with an aliphatic polyhydric alcohol, can be mentioned.

Examples of the fatty acid to constitute the fatty acid ester include saturated fatty acids, such as caproic acid, caprylic acid, capric acid, lauric acid, myristic acid, palmitic acid, stearic acid, arachic acid, behenic acid, and lignoceric acid; and unsaturated fatty acids, such as myristoleic acid, palmitoleic acid, oleic acid, and linoleic acid.

The aliphatic polyhydric alcohol to constitute the fatty acid ester is preferably a polyhydric alcohol of a dihydric to hexahydric alcohol, and specific examples thereof include ethylene glycol, glycerol, trimethylolpropane, pentaerythritol, and sorbitol.

In the lubricating oil composition of one embodiment of the present invention, the content of the component (G) is preferably 0.01 to 10 mass %, more preferably 0.05 to 7 mass %, still more preferably 0.1 to 5 mass %, and still much more preferably 0.2 to 3 mass %, based on the total amount (100 mass %) of the lubricating oil composition.

<Lubricating Oil Additives>

The lubricating oil composition of one embodiment of the present invention may further contain lubricating oil additives other than the components (B) to (G) when needed, as long as the effects of the present invention are not impaired.

Examples of such lubricating oil additives include a pour point depressant, a metal-based detergent, a demulsifier, a metal deactivator, an anti-rust agent, an anti-foaming agent, and a colorant.

These lubricating oil additives may be each used singly, or may be each used in combination of two or more.

The contents of these lubricating oil additives can be each appropriately adjusted as long as the effects of the present invention are not impaired, but the contents of the additives are each independently preferably 0.0001 to 15 mass %, more preferably 0.0005 to 10 mass %, and still more preferably 0.001 to 5 mass %, based on the total amount (100 mass %) of the lubricating oil composition.

The lubricating oil composition of one embodiment of the present invention may be a lubricating oil composition containing oleic acid, or may be a lubricating oil composition containing no oleic acid.

In the lubricating oil composition of one embodiment of the present invention, the content of oleic acid may be less than 5.0 mass %, less than 4.0 mass %, less than 3.0 mass %, less than 2.0 mass %, less than 1.0 mass %, less than 0.5 mass %, less than 0.1 mass %, less than 0.05 mass %, less than 0.01 mass %, less than 0.005 mass %, or less than 0.001 mass %, based on the total amount (100 mass %) of the lubricating oil composition.

<Method for Producing Lubricating Oil Composition>

The method for producing a lubricating oil composition of one embodiment of the present invention is not particularly limited, but in view of productivity, preferable is a method including a step of adding the components (B) and (C), and if necessary, the components (D) to (G) and other lubricating oil additives to the component (A).

It is preferable that the resin component such as the component (F) be in the form of a solution in which it is dissolved in a diluent oil and that the solution be added to the component (A), in view of compatibility with the component (A).

[Properties of Lubricating Oil Composition]

The kinematic viscosity of the lubricating oil composition of one embodiment of the present invention at 40° C. is preferably 5.0 to 130 mm$^2$/s, more preferably 6.5 to 100 mm$^2$/s, still more preferably 8.0 to 100 mm$^2$/s, still much more preferably 10.0 to 70 mm$^2$/s, and particularly preferably 12.0 to 50 mm$^2$/s.

The viscosity index of the lubricating oil composition of one embodiment of the present invention is preferably 90 or more, more preferably 100 or more, still more preferably 110 or more, still much more preferably 130 or more, and particularly preferably 150 or more.

In view of obtaining a lubricating oil composition having more improved wear resistance, the content of sulfur atoms in the lubricating oil composition of one embodiment of the present invention is preferably 0.01 mass % or more, more preferably 0.03 mass % or more, still more preferably 0.05 mass % or more, still much more preferably 0.08 mass % or more, and particularly preferably 0.1 mass % or more, or may be 0.11 mass % or more, or 0.12 mass % or more, and in view of obtaining a lubricating oil composition having good heat stability, it is preferably 1.0 mass % or less, more preferably 0.8 mass % or less, still more preferably 0.5 mass % or less, still much more preferably 0.4 mass % or less, and particularly preferably 0.3 mass % or less, or may be 0.27 mass % or less, 0.25 mass % or less, 0.23 mass % or less, 0.22 mass % or less, 0.21 mass % or less, or 0.20 mass % or less, based on the total amount (100 mass %) of the lubricating oil composition.

In view of obtaining a lubricating oil composition having more improved wear resistance, the content of phosphorus atoms in the lubricating oil composition of one embodiment of the present invention is preferably 0.01 mass % or more, more preferably 0.02 mass % or more, still more preferably 0.03 mass % or more, still much more preferably 0.04 mass % or more, and particularly preferably 0.05 mass % or more, or may be 0.055 mass % or more, 0.06 mass % or more, 0.065 mass % or more, or 0.070 mass % or more, and it is preferably 2.0 mass % or less, more preferably 1.5 mass % or less, still more preferably 1.2 mass % or less, still much more preferably 1.0 mass % or less, and particularly preferably 0.085 mass % or less, or may be 0.082 mass % or less, 0.080 mass % or less, or 0.078 mass % or less, based on the total amount (100 mass %) of the lubricating oil composition.

[Characteristics and Application of Lubricating Oil Composition]

The lubricating oil composition of one embodiment of the present invention is excellent in characteristics including heat stability, wear resistance, handling stability of a shock absorber, etc.

As a specific index of these characteristics, the amount of sludge is preferably 200 mg or less, more preferably 150 mg or less, still more preferably 100 mg of less, still much more preferably 50 mg or less, and particularly preferably 30 mg or less, as measured when a heat stability test in accordance with the description of Examples described later is carried out on the lubricating oil composition of one embodiment of the present invention.

It can be said that as the value of the amount of sludge is smaller, the heat stability of the lubricating oil composition is better.

The wear mark diameter is preferably 500 μm or less, more preferably 470 μm or less, still more preferably 450 μm or less, still much more preferably 440 µm or less, and particularly preferably 420 µm or less, or may be 400 µm or less, 395 µm or less, or 390 µm or less, as measured when a wear resistance test in accordance with the description of Examples described later is carried out on the lubricating oil composition of one embodiment of the present invention.

It can be said that as the value of the wear mark diameter is smaller, the wear resistance of the lubricating oil composition is better.

A maximum coefficient of dynamic friction between a rubber material and a chromium material is preferably 0.26 or more, more preferably 0.27 or more, still more preferably 0.28 or more, still much more preferably 0.30 or more, and particularly preferably 0.31 or more, as measured when a rubber friction test in accordance with the description of Examples described later is carried out on the lubricating oil composition of one embodiment of the present invention.

It can be said that as the value of the maximum coefficient of dynamic friction is larger, the shock absorber handling stability of the lubricating oil composition is better.

Since the lubricating oil composition of one embodiment of the present invention has such characteristics as above, it can be preferably applied to lubrication of a shock absorber. More specifically, the lubricating oil composition of one embodiment of the present invention can be used for any of a double cylinder type shock absorber and a single cylinder type shock absorber, and can be preferably used for any of shock absorbers for motorcycles and for four-wheeled vehicles.

Moreover, since the lubricating oil composition of one embodiment of the present invention particularly has a high maximum coefficient of dynamic friction between a rubber material and a chromium material, it can be preferably used for lubrication of a shock absorber having an oil seal made of at least rubber and a piston rod having at least chromium-made sliding part (for example, chromium plating) that comes into contact with the oil seal.

Accordingly, when these characteristics of the lubricating oil composition of one embodiment of the present invention are taken into consideration, the present invention can also provide the following [1] and [2].

[1] A shock absorber filled with the aforementioned lubricating oil composition of one embodiment of the present invention.

[2] Use of a lubricating oil composition, in which the aforementioned lubricating oil composition of one embodiment of the present invention is applied to lubrication of a shock absorber.

Since the lubricating oil composition of one embodiment of the present invention has such characteristics as above, it can be preferably applied to not only lubricating oil for a shock absorber but also, for example, hydraulic oil, hydraulic oil for construction machinery, power steering fluid, turbine oil, compressor oil, machine tool lubricating oil, cutting oil, gear oil, fluid bearing oil, and rolling bearing oil.

EXAMPLES

Next, the present invention will be described in much more detail with reference to Examples, but the present invention is in no way limited to these Examples.

Measuring methods or evaluation methods for various properties are as follows.
(1) Kinematic Viscosity, Viscosity Index
The measurement and calculation were performed in accordance with JIS K2283:2000.
(2) Contents of Zinc Atoms and Phosphorus Atoms
The measurement was performed in accordance with JPI-5S-38-2003.
(3) Content of Nitrogen Atoms
The measurement was performed in accordance with JIS K2609.
(4) Content of Sulfur Atoms
The measurement was performed in accordance with JIS K2541-6.
(5) Base Number
The measurement was performed in accordance with JIS K2501:2003 (perchloric acid method).
(6) Weight-Average Molecular Weight (Mw)
Using a gel permeation chromatograph apparatus (manufactured by Agilent Technologies, Inc., "1260 model HPLC"), the weight-average molecular weight was measured under the following conditions, and the found value in terms of standard polystyrene was used.
(Measurement Conditions)
Column: sequentially connected two of "Shodex LF404".
Column temperature: 35° C.
Eluent: chloroform
Flow rate: 0.3 mL/min Examples 1 to 6, Comparative Examples 1 to 4

Using the types and the amounts shown in Table 1, various additives were added to a base oil, thereby preparing each lubricating oil composition. Even when various additives were each added in a state where it was dissolved in a diluent oil, the amounts of the additives described in Table 1 are each an amount in terms of an active ingredient (in terms of solid content) excluding the mass of the diluent oil.

Details of the base oil and various additives used in the preparation of each lubricating oil composition are as follows.
<Component (A): Base Oil>
"Mineral oil": hydrorefined mineral oil classified in Group III of API base oil categories.
<Component (B): Zinc Dithiophosphate>
"ZnDTP": zinc dialkyldithiophosphate represented by the general formula (b-1) ($R^1$ to $R^4$ in the formula (b-1) are each an alkyl group), zinc atom (Zn) content=8.75 mass %, sulfur atom (S) content=15.0 mass %, phosphorus atom (P) content=7.5 mass %.
<Component (C): Alkenylsuccinic Imide>
"Alkenylsuccinic imide": boron-unmodified alkenylsuccinic acid monoimide represented by the general formula (c-1) ($R^4$ in the formula (c-1) is a polybutenyl group), nitrogen atom (N) content=1.8 mass %, base number (perchloric acid method)=42 mg KOH/g.
<Component (D): Extreme Pressure Additive>
"P-based extreme pressure additive": mixture of hydrogen phosphite diester and hydrogen phosphite monoester, phosphorus atom (P) content=1.3 mass %.
"SP-based extreme pressure additive (1)": thiophosphate, sulfur atom (S) content=4.4 mass %, phosphorus atom (P) content=4.1 mass %.
"SP-based extreme pressure additive (2)": thiophosphonate, sulfur atom (S) content=20.8 mass %, phosphorus atom (P) content=9.6 mass %.
<Component (E): antioxidant>
"Phenolic antioxidant"
<Component (F): Viscosity Index Improver>
"PMA": polymethacrylate having Mw=540000.
<Component (G): friction modifier>
"Fatty acid ester": pentaerythritol monooleate.

For the lubricating oil compositions prepared, the 40° C. kinematic viscosity, the viscosity index and the content of atoms were measured or calculated in accordance with the aforementioned methods, and the following evaluation was carried out. The results of them are set forth in Table 1.

(1) Heat Stability Test

In a 200 mL beaker, SPCC (121.4 mm×26 mm×0.5 mm) and a copper plate (60.4 mm×26 mm×0.5 mm) as catalysts were added to 100 mL of the lubricating oil composition prepared in each of Examples and Comparative Examples, and they were allowed to stand still for 240 hours in a constant temperature bath at 140° C. After the standing still, the amount of sludge (unit: mg) generated on the bottom of the beaker was measured. It can be said that as the amount of sludge is smaller, the heat stability of the lubricating oil composition is better. In the present Examples, a case where the amount of sludge was 200 mg or less was rated as "pass".

(2) Wear Resistance Test

Using a Bowden type reciprocating dynamic friction tester, a test was carried out under the following test conditions, and a wear width of a wear mark formed on a steel plate of a lower-side test specimen was measured. It can be said that as the wear width is smaller, the wear resistance of the lubricating oil composition is better. In the present Examples, a case where the wear width was 500 μm or less was rated as "pass".

(Test Conditions)
Oil temperature: 40° C.
Amplitude: 10 mm
Velocity: 50 mm/s
Load: 3 kgf
Testing time: 60 minutes
Friction material: upper-side test specimen: ½-inch glass sphere, lower-side test specimen: SPCC (3) Rubber Friction Test Using a Bowden type reciprocating dynamic friction tester, a test was carried out under the following test conditions, and a maximum coefficient of dynamic friction between an upper-side test specimen (rubber material) and a lower-side test specimen (chromium plated plate) was measured. It can be said that as the value of the maximum coefficient of dynamic friction is larger, the shock absorber handling stability of the lubricating oil composition is better. In the present Examples, a case where the maximum coefficient of dynamic friction was 0.26 or more was rated as "pass".

(Test Conditions)
Oil temperature: 40° C.
Amplitude: 5 mm
Velocity: 1 mm/s
Load: 1.0 kgf
Friction material: upper-side test specimen: rubber material (A437), lower-side test specimen: chromium plated plate

TABLE 1

|  |  |  |  | Example 1 | Example 2 | Example 3 | Example 4 | Example 5 | Example 6 |
|---|---|---|---|---|---|---|---|---|---|
| Formulation of lubricating oil composition | Component (A) | Mineral oil | mass % | 95.5 | 95.0 | 95.9 | 95.9 | 95.9 | 93.1 |
| | Component (B) | ZnDTP | mass % | 0.8 | 0.8 | 0.8 | 0.8 | 0.8 | 0.8 |
| | Component (C) | Alkenylsuccinic imide | mass % | 1.2 | 1.2 | 0.8 | 0.8 | 0.8 | 3.6 |
| | Component (D) | P-based extreme pressure additive | mass % | 0.5 | 1.0 | 0.5 | | | 0.5 |
| | | SP-based extreme pressure additive (1) | mass % | | | | 0.5 | | |
| | | SP-based extreme pressure additive (2) | mass % | | | | | 0.5 | |
| | Component (E) | Phenolic antioxidant | mass % | 0.5 | 0.5 | 0.5 | 0.5 | 0.5 | 0.5 |
| | Component (F) | PMA | mass % | 0.5 | 0.5 | 0.5 | 0.5 | 0.5 | 0.5 |
| | Component (G) | Fatty acid ester | mass % | 1.0 | 1.0 | 1.0 | 1.0 | 1.0 | 1.0 |
| | | Total | mass % | 100.0 | 100.0 | 100.0 | 100.0 | 100.0 | 100.0 |
| Properties of lubricating oil composition | | Kinematic viscosity at 40° C. | mm²/s | 12.7 | 12.7 | 12.2 | 12.2 | 12.1 | 13.4 |
| | | Viscosity index | — | 165 | 163 | 165 | 167 | 165 | 161 |
| | | Content of Zn derived from component (B) | mass % | 0.07 | 0.07 | 0.07 | 0.07 | 0.07 | 0.07 |
| | | Content of N derived from component (C) | mass % | 0.02 | 0.02 | 0.01 | 0.01 | 0.01 | 0.06 |
| | | Zn derived from component (B)/N derived from component (C) | — | 3.5 | 3.5 | 7.0 | 7.0 | 7.0 | 1.2 |
| | | S content based on total amount of lubricating oil composition | mass % | 0.120 | 0.120 | 0.120 | 0.142 | 0.224 | 0.120 |
| | | P content based on total amount of lubricating oil composition | mass % | 0.067 | 0.073 | 0.067 | 0.081 | 0.108 | 0.067 |
| Tests | | (1) Heat stability test Amount of sludge | mg | 25 | 27 | 28 | 35 | 23 | 23 |
| | | (2) Wear resistance test Wear width | μm | 437 | 384 | 389 | 403 | 415 | 473 |
| | | (3) Rubber friction test Maximum coefficient of dynamic friction | — | 0.33 | 0.34 | 0.31 | 0.32 | 0.33 | 0.30 |

|  |  |  |  | Comparative Example 1 | Comparative Example 2 | Comparative Example 3 | Comparative Example 4 |
|---|---|---|---|---|---|---|---|
| Formulation of lubricating oil composition | Component (A) | Mineral oil | mass % | 96.7 | 96.7 | 96.7 | 96.7 |
| | Component (B) | ZnDTP | mass % | 0.8 | 0.8 | 0.8 | |
| | Component (C) | Alkenylsuccinic imide | mass % | | | | 0.8 |
| | Component (D) | P-based extreme pressure additive | mass % | 0.5 | | | 0.5 |
| | | SP-based extreme pressure additive (1) | mass % | | 0.5 | | |
| | | SP-based extreme pressure additive (2) | mass % | | | 0.5 | |

TABLE 1-continued

|  |  |  | | | | | |
|---|---|---|---|---|---|---|---|
| | Component (E) | Phenolic antioxidant | mass % | 0.5 | 0.5 | 0.5 | 0.5 |
| | Component (F) | PMA | mass % | 0.5 | 0.5 | 0.5 | 0.5 |
| | Component (G) | Fatty acid ester | mass % | 1.0 | 1.0 | 1.0 | 1.0 |
| | | Total | mass % | 100.0 | 100.0 | 100.0 | 100.0 |
| Properties of lubricating oil composition | | Kinematic viscosity at 40° C. | mm²/s | 12.2 | 12.2 | 12.0 | 12.2 |
| | | Viscosity index | — | 165 | 167 | 165 | 165 |
| | | Content of Zn derived from component (B) | mass % | 0.07 | 0.07 | 0.07 | 0 |
| | | Content of N derived from component (C) | mass % | 0 | 0 | 0 | 0.01 |
| | | Zn derived from component (B)/N derived from component (C) | — | — | — | — | — |
| | | S content based on total amount of lubricating oil composition | mass % | 0.120 | 0.142 | 0.224 | 0 |
| | | P content based on total amount of lubricating oil composition | mass % | 0.067 | 0.081 | 0.108 | 0.007 |
| Tests | | (1) Heat stability test Amount of sludge | mg | 1622 | 643 | 980 | 25 |
| | | (2) Wear resistance test Wear width | μm | 361 | 385 | 396 | 521 |
| | | (3) Rubber friction test Maximum coefficient of dynamic friction | — | 0.33 | 0.32 | 0.32 | 0.25 |

From Table 1, the results for the lubricating oil compositions prepared in Examples 1 to 6 were superior to the lubricating oil compositions of Comparative Examples 1 to 4 in heat stability, wear resistance and handling stability of a shock absorber.

The invention claimed is:

1. A lubricating oil composition suitable for lubrication of a shock absorber in contact with a rubber component, the composition comprising:
  a base oil (A) comprising a mineral oil classified in Group III of API;
  a zinc dithiophosphate (B) comprising a zinc dialkyldithiophosphate; and
  an alkenylsuccinic imide (C),
  wherein the zinc dithiophosphate (B), in terms of zinc atoms, is present in a range of from 0.035 to 0.14 mass %, based on total lubricating oil composition mass,
  wherein the alkenylsuccinic imide (C), in terms of nitrogen atoms, is present in a range of from 0.005 to 0.12 mass %, based on the total lubricating oil composition mass, and
  wherein the lubricating oil composition has a kinematic viscosity at 40° C. in a range of from 5.0 to 50 mm²/s.

2. The composition of claim 1, further comprising:
  an extreme pressure additive (D) comprising a sulfur atom and/or a phosphorus atom.

3. The composition of claim 1, wherein a Zn/N ratio of a zinc atom content from the zinc dithiophosphate (B) to a nitrogen atom content from the alkenylsuccinic imide (C) is in a range of from 0.1 to 150.

4. The composition of claim 1, comprising phosphorus atoms in a range of from 0.01 to 2.0 mass %, based on the total lubricating oil composition mass.

5. The composition of claim 1, comprising sulfur atoms in a range of from 0.01 to 1.0 mass %, based on the total lubricating oil composition mass.

6. A shock absorber, comprising:
  the lubricating oil composition of claim 1, filled therein.

7. A method of lubricating a shock absorber, the method comprising:
  applying the lubricating oil composition of claim 1 to the shock absorber.

8. The composition of claim 1, further comprising:
  an extreme pressure additive (D) comprising a sulfur atom and/or a phosphorus atom.

9. The composition of claim 1, further comprising:
  an extreme pressure additive (D) comprising a sulfur atom.

10. The composition of claim 1, further comprising:
  an extreme pressure additive (D) comprising a phosphorus atom.

11. The composition of claim 1, further comprising:
  an extreme pressure additive (D) comprising a sulfur atom and a phosphorus atom.

12. The composition of claim 8, wherein a Zn/N ratio of a zinc atom content from the zinc dithiophosphate (B) to a nitrogen atom content from the alkenylsuccinic imide (C) is in a range of from 0.1 to 150.

13. The composition of claim 8, comprising phosphorus atoms in a range of from 0.01 to 2.0 mass %, based on the total lubricating oil composition mass.

14. The composition of claim 12, comprising phosphorus atoms in a range of from 0.01 to 2.0 mass %, based on the total lubricating oil composition mass.

15. The composition of claim 14, comprising sulfur atoms in a range of from 0.01 to 1.0 mass %, based on the total lubricating oil composition mass.

16. The composition of claim 1, having a Zn/N ratio of zinc atom content derived from the zinc dithiophosphate (B) to nitrogen atom content from the alkenylsuccinic imide (C) of 2.0 or more.

17. The composition of claim 2, comprising the base oil (A), the zinc dithiophosphate (B), alkenylsuccinic imide (C), and the extreme pressure additive (D), together, in 92 mass % or more.

18. The composition of claim 1, wherein, based on total lubricating oil composition mass,
  the zinc dithiophosphate (B), in terms of zinc atoms, is present in a range of from 0.04 to 0.12 mass %, and
  the alkenylsuccinic imide (C), in terms of nitrogen atoms, is present in a range of from 0.005 to 0.09 mass %.

19. The composition of claim 1, wherein based on total lubricating oil composition mass,
  the zinc dithiophosphate (B), in terms of zinc atoms, is present in a range of from 0.05 to 0.11 mass %, and
  the alkenylsuccinic imide (C), in terms of nitrogen atoms, is present in a range of from 0.007 to 0.08 mass %.

20. The composition of claim 1, wherein based on total lubricating oil composition mass,
  the zinc dithiophosphate (B), in terms of zinc atoms, is present in a range of from 0.06 to 0.10 mass %, and
  the alkenylsuccinic imide (C), in terms of nitrogen atoms, is present in a range of from 0.009 to 0.07 mass %.

* * * * *